United States Patent
Doron et al.

(10) Patent No.: US 9,094,241 B2
(45) Date of Patent: Jul. 28, 2015

(54) CHANNEL ESTIMATION PROCESSING FOR PERFORMANCE IMPROVEMENT IN LOW SNR REGIME

(75) Inventors: Ayelet Doron, Modi'in (IL); Yuval Lomnitz, Herzelia (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/995,705

(22) PCT Filed: Dec. 28, 2011

(86) PCT No.: PCT/US2011/067483
§ 371 (c)(1),
(2), (4) Date: Jun. 19, 2013

(87) PCT Pub. No.: WO2013/100930
PCT Pub. Date: Jul. 4, 2013

(65) Prior Publication Data
US 2013/0322583 A1    Dec. 5, 2013

(51) Int. Cl.
*H04L 27/06* (2006.01)
*H04L 25/02* (2006.01)

(52) U.S. Cl.
CPC ........ *H04L 25/0202* (2013.01); *H04L 25/0212* (2013.01); *H04L 25/0224* (2013.01); *H04L 25/0256* (2013.01)

(58) Field of Classification Search
CPC ............ H04L 25/0202; H04L 25/0224; H04L 25/0212; H04L 25/0256
USPC ........................................................ 375/340
See application file for complete search history.

(56) References Cited

U.S. PATENT DOCUMENTS

| | | | |
|---|---|---|---|
| 2002/0183082 A1* | 12/2002 | Kohlmann | 455/502 |
| 2004/0125788 A1* | 7/2004 | Pietraski et al. | 370/350 |
| 2004/0143559 A1* | 7/2004 | Ayala | 706/13 |
| 2004/0247058 A1* | 12/2004 | Abraham | 375/346 |
| 2004/0248602 A1* | 12/2004 | Demir et al. | 455/502 |
| 2005/0039185 A1* | 2/2005 | Heidari-Bateni et al. | 718/104 |

(Continued)

FOREIGN PATENT DOCUMENTS

WO    2013/100930 A1    7/2013

OTHER PUBLICATIONS

International Search Report and Written Opinion Received for PCT Patent Application No. PCT/US2011/067483, mailed on Aug. 29, 2012, 9 pages.

(Continued)

*Primary Examiner* — Erin File
(74) *Attorney, Agent, or Firm* — Ellis B. Ramirez; Prass LLP

(57) ABSTRACT

Disclosed is an improved channel estimation by post-processing of the channel response that is generated by a Golay correlator The processing is done using time-domain operations such as gating and filtering. Gating is performed on the estimated channel response taps in order to reduce the noise level. Pre-filtering the channel response through a filter matched to the transmitted pulse-shape improves the probability of detecting the channel peaks. Post-filtering the processed channel impulse response to eliminate the high frequency effects that are added by the windowing and gating operations.

21 Claims, 6 Drawing Sheets

(56) References Cited

U.S. PATENT DOCUMENTS

| | | |
|---|---|---|
| 2005/0044327 A1* | 2/2005 | Howard et al. ............... 711/147 |
| 2005/0147079 A1* | 7/2005 | Lakkis ......................... 370/350 |
| 2010/0135376 A1 | 6/2010 | Wang et al. |
| 2010/0266053 A1 | 10/2010 | Sakamoto et al. |
| 2011/0159831 A1 | 6/2011 | Jiang |
| 2012/0243512 A1* | 9/2012 | Swarts et al. ................ 370/335 |

OTHER PUBLICATIONS

International Preliminary Report on Patentability and Written Opinion received for PCT Patent Application No. PCT/US2011/67483, mailed on Jul. 10, 2014, 6 pages.

Hsiao et al., "A 7Gb/s SC-FDE/OFDM MMSE Equalizer for 60GHz Wireless Communications", IEEE Asian Solid-State Circuits Conference, Nov. 14-16, 2011, pp. 293-296.

* cited by examiner

CHANNEL ESTIMATION PROCESSING FOR PERFORMANCE IMPROVEMENT IN LOW SNR REGIME

BACKGROUND

1. Field of the Disclosed Embodiments

The disclosure relates to wireless communication and, more particularly to a system and method for channel estimation in wireless systems.

2. Introduction

A personal wireless area network (WPAN) is a network used for communication among computing devices (for example, personal devices such as telephones and personal digital assistants) close to one person. The reach of a WPAN may be a few meters. WPANs may be used for interpersonal communication among personal devices themselves, or for connecting via an uplink to a higher level network, for example, the Internet.

The millimeter-wave WPAN and/or mm Wave network may allow very high data rates (e.g., over 2 Gigabit per second (Gbps)) applications such as high speed Internet access, streaming content download (e.g., video on demand, high-definition television (HDTV), home theater, etc.), real time streaming and wireless data bus for cable replacement.

Accurate channel state information (CSI) estimation is desirable in order to take advantage of the potential of millimeter-wave WPAN and/or mm Wave network capacity. In particular, with accurate CSI estimation, CSI can be exploited for optimum or quasi-optimum precoder and equalizer designs with the purpose of maximizing system performance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DISCLOSED EMBODIMENTS

Figure 1:
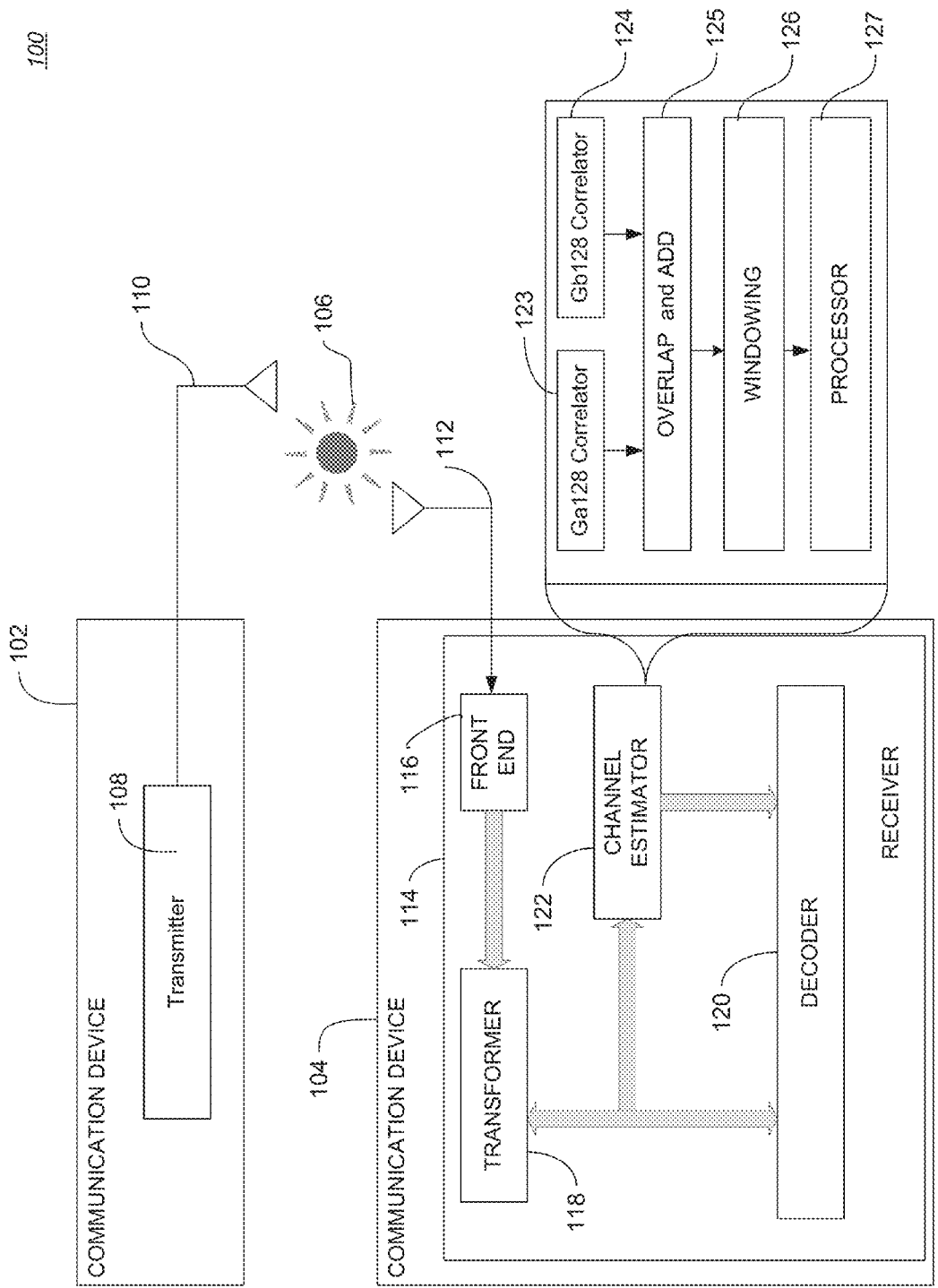
FIG. 1 is a schematic of a wireless communication system in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Aspects of the disclosed embodiments relate to a method of channel estimation by processing, using time-domain operations, a channel response that is generated by a Golay correlator in a device capable of performing wireless communications. Processing comprises one or a combination of soft gating, variable gating, oversampling, use of Wiener post-filter, and the like.

A further aspect of the disclosed embodiments relate to a method wherein the processing comprises gating that is selected from a group consisting of smooth gating, threshold gating, oversampling with smooth gating or threshold gating, threshold gating based on noise level, gating with a time-dependent threshold, adaptive gating, windowing and a combination thereof.

Although embodiments of the invention are not limited in this regard, discussions utilizing terms such as, for example, "processing," "computing," "calculating," "determining," "applying," "receiving," "establishing", "analyzing", "checking", or the like, may refer to operations(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "device" as used herein includes, for example, a device capable of wireless communication, a communication device capable of wireless communication, a communication station capable of wireless communication, a portable or nonportable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN/WLAN stations intended to be within the scope of the present invention include, although are not limited to, stations capable of operating as a multi-band stations, stations capable of operating as PCP, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with suitable limited range or short-range wireless communication networks, for example, "piconets", e.g., a wireless area network, a WVAN, a WPAN, and the like.

The WiGig and IEEE802.11ad specifications have defined a multi-band operation mechanism that allows integration and seamless operation across different frequency bands and channels. This multi-band mechanism, also known as fast session transfer (FST), is expected to become a key component in future generation Wi-Fi based wireless systems given: 1) The proliferation of frequency bands where Wi-Fi operates and will operate. 2) The significantly improved user experience that FST may provide, due to its seamless and fast transfer of session between any two bands/channels.

FIG. 1 is a schematic of a wireless communication system 100 in accordance to an embodiment. The communication system 100 may include a first communication device 102 able to communicate with a second communication device 104 over a communication channel 106. For example, device 102 and/or device 104 may include a station, e.g., in accordance with the 802.11ad standard.

Device 102 comprises Ntx antennas 110 and the receiver 104 comprises Nrx antennas 112, a single data stream is transmitted over channel 106 by a single antenna or over multiple antennas using beam-forming. The single data stream may be split into multiple sub-data streams that are then individually and simultaneously transmitted over the same communication channel such as channel 106 from the multiple antennas. Although the scope of the present invention is not limited in this respect, types of antennae that may be used for antennas 110 and/or 112 may include but are not limited to internal antenna, dipole antenna, omni-directional antenna, a monopole antenna, an end fed antenna, a circularly polarized antenna, a micro-strip antenna, a diversity antenna and the like.

Communication device 102 may include a transmitter 108 to transmit a beam-formed transmission by transmitting the data stream via Ntx antennas 110, respectively.

Communication device 104 may include a receiver 114 to receive the data stream over channel 106. For example, receiver 114 may receive a beam-formed signal-via Nrx antennas 112, respectively. The received signal may include symbols corresponding, for example, to symbols of the signal transmitted by transmitter 108.

Receiver 114 may include a front end 116 and/or a transformer 118. Front end 116 may include any suitable front end module to convert a time-domain signal received from antenna 112 into a time-domain signal of a format suitable for transformer 118. Transformer 118 may transform the signal into a plurality of different types of signals that would be suitable for decoder 120 or channel estimator 122

Receiver 114 may also include a channel estimator 122 to generate a signal representing channel estimation. Receiver 114 may also include a decoder 120 to decode the received signal and to generate signal representing an estimation of the signal transmitted by device 102, e.g., as described in detail below. Channel estimator 122 uses Golay sequences with extended processing to arrive at the channel estimation. Golay sequences have the property that if Ga(n) and Gb(n) are a complementary pair, the sum of correlation of Ga with itself and Gb with itself is equal to the delta function. This property makes these sequences very useful for channel estimation. Transmitter 108 transmits a predefined Golay sequences that is processed at the receiver (RX) with the same sequence. The correlation between the sequences is a delta function in time and the received signal after the correlator is the channel impulse response.

Figure 5:
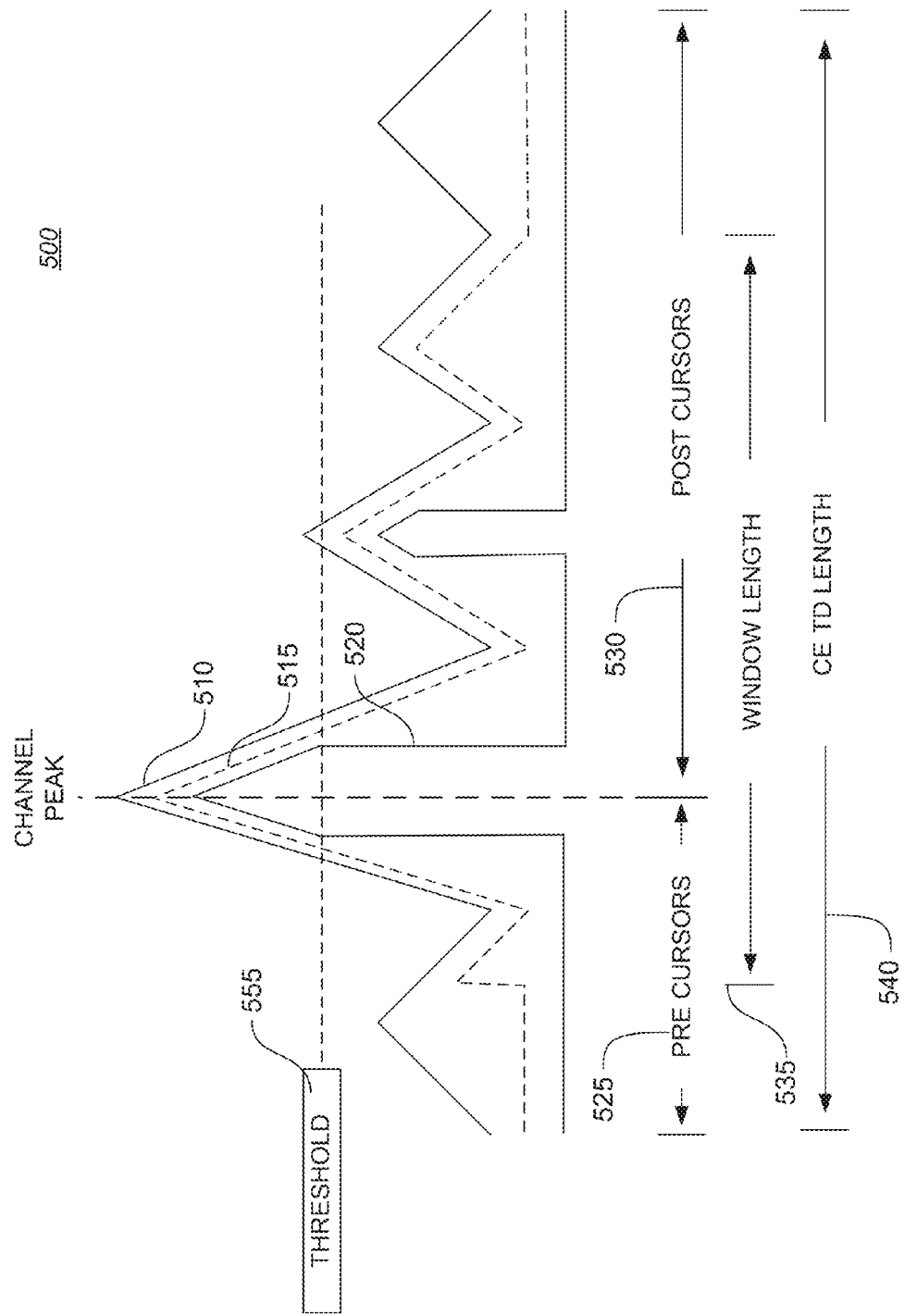
FIG. 5 is a waveform illustrating gating and windowing on channel response in accordance to an embodiment; and, FIG. 6 is a flowchart of a method for channel estimation from a response generated by a Golay correlator in accordance to an embodiment.

Channel estimator 122 comprises a pair of correlators for complementary Golay sequences G'a and G'b which are used to generate a channel estimate. The sequences a and b may be generated by 128-chip Golay sequences $Ga_{128}$ 123 and $Gb_{128}$ 124. The channel response that is generated by the Golay Correlator ($Ga_{128}$ and $Gb_{128}$) is passed through a Overlap and Add ("OLA") module 125 that implements the overlap-add algorithm. The overlap-add or overlap-save method process each of the components from the correlators (Ga128 and Gb128) in some useful way and recombine the processed components into the series of sequences for processing. The signal from the Overlap and Add module 125 is then processed through windowing module 125. The windowing operation is performed in the time domain, the starting position of the window of length L is set to align with the tap then the taps outside the window of length L would be discarded. The window is aligned around the channel peak, including some taps before the peak (pre-cursors) and some after the peak (post-cursors) as shown in FIG. 5. The window use could be square or rectangular in shape in order to extract common descriptors The final stage of the channel estimator is processor 127 where the Golay correlator outputs are further processed using time-domain operation to improve channel estimation performance.

Figure 2:
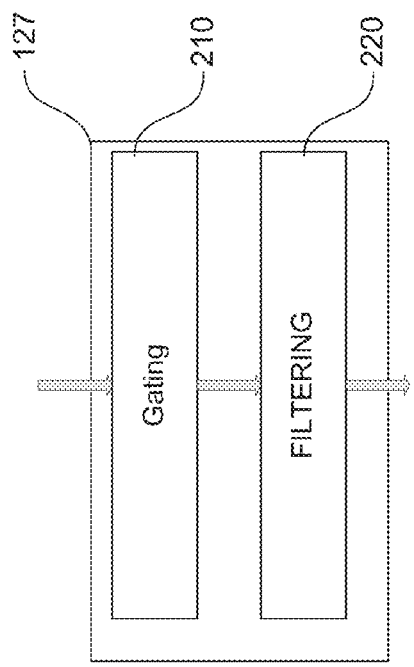
FIG. 2 is a block diagram of a processor with post-processing filtering for channel estimation from a response generated by a Golay correlator in accordance to an embodiment.

FIG. 2 is a block diagram of a processor with post-processing filtering for channel estimation 200 from a response generated by a Golay correlator in accordance to an embodiment. Processor 127 comprises a gating module 210 and post-processing filtering 220. Post-processing filtering 220 of the processed channel impulse response (after windowing and gating) is applied, in order to eliminate the high frequency effects that are added by the windowing and gating operations performed at or before gating module 210.

The gating module 210 performs a non-linear operation on the estimated channel response taps in order to reduce the noise level. The simplest operation performed by gating module 210 is comparing each tap's absolute value to a threshold and zeroing the taps that are below the threshold. The threshold is proportional to the absolute value of the strongest tap ($S_{TV}$) such as $0.375*S_{TV}$. The underlying assumption is that the channel is sparse, i.e. composed of a small number of peaks. The gating output should be a channel response with a small number of significant taps. By the gating operation we might discard also some small taps, which might be non-resolvable from noise samples. This can be acceptable, as long as the channel estimation error is lower than the noise floor with required margin, i.e. channel estimation error (CEE)≤(noise floor-margin).

In addition to the threshold gating operation, the gating module 210 may select gating functions that include, but are not limited to, smooth gating, threshold based on noise level or signal to noise ratio (SNR), gating with a time-dependent threshold, adaptive gating, and the like. The above gating functions can include a pre-step which can be applied before gating such as oversampling. When oversampling is used, the gating is performed on an oversampled signal. In straightforward gating performed at the Nyquist frequency or slightly higher (1 or 1.5 times the Nyquist frequency), a channel tap that falls in-between two samples has a lower chance of being detected. By oversampling the signal this phenomenon is mitigated and the performance improves. The estimated channel response in time domain is first oversampled (e.g. to two times (×2) or four times (×4) its original rate), then gating is applied (either threshold or smooth gating operations), and then the channel response is filtered and re-sampled again to its original sampling rate.

In smooth gating the gating module 210 is applying operations other than threshold. For example, smooth nonlinear functions may be applied. One example is the minimum mean square error (MMSE) estimate given a channel model. Specifically, using the model that each channel tap is either 0 or distributed Rayleigh with a certain power.

$$h = \begin{cases} 0 & \text{with Probability } 1-\varepsilon \\ CN(0, 1) & \text{with Probability } \varepsilon \end{cases}$$

The input to the gating function is modeled as a noisy version of the channel Y=h+v where v~CN(0, $\sigma^2$) and the corrected channel using MMSE estimation is:

$$\hat{h} = E(h \mid y) = \frac{1}{1+\alpha \cdot e^{-\beta|y|^2}} \cdot \frac{1}{1+\sigma^2} \cdot y = g(|y|^2) \cdot y,$$

where $$\alpha = \frac{(1+\sigma^2)(1-e)}{\sigma^2 e}$$

and $$\beta = \frac{1}{(1+\sigma^2)\sigma^2}.$$

The function g ($|y|^2$) is increasing in |y| can be regarded as a "smooth" gating function. The performance is improved (compared to the optimal threshold) by a factor of ~1 dB.

In Threshold based on noise level/SNR the gating module 210 performs gating based on a function of the peak channel response or of the estimated noise level, or a combination of both. In each case a different balance between rejection of noise and rejection of sidelobes is obtained.

In Gating with a time-dependent threshold the gating module 210 performs gating with a time-dependent threshold (time here means the location within the window). This method allows for effective combining of "windowing" and "gating", i.e. instead of assuming the channel energy outside a certain window is small enough to be ignored, we assume a certain decline in expected strength of channel peaks which are distance from the main peak, and the result is that the gating threshold increases with the distance from channel peak.

In adaptive gating, the gating module 210 learns the average energy in each time lag (i.e. over many channel instances), and the gating threshold is adapted over time. The gating threshold is lower at lags were more energy was identified (since the chances that a certain sample contains channel information rather than noise are higher).

The post-processing filtering 220 is for filtering of the processed channel impulse response (after windowing and gating) is applied, in order to eliminate the high frequency effects that are added by the windowing and gating operations. A simple low-pass filter (LPF) with cut-off frequency which corresponds to the signal bandwidth can be used. The filter may be applied to the estimated channel, or, as an implementation optimization, the filtering may be applied to the data signal instead of being applied to the channel estimate (this substitution has the same/similar result).

The filter can be a Wiener filter as LPF. To apply this solution the cross-correlation function between the original channel and the gated channel estimate is evaluated (either by calculation or by Monte Carlo simulation), and is used to construct an MMSE-optimal Wiener filter to estimate the channel, given the gated channel estimate.

Figure 3:
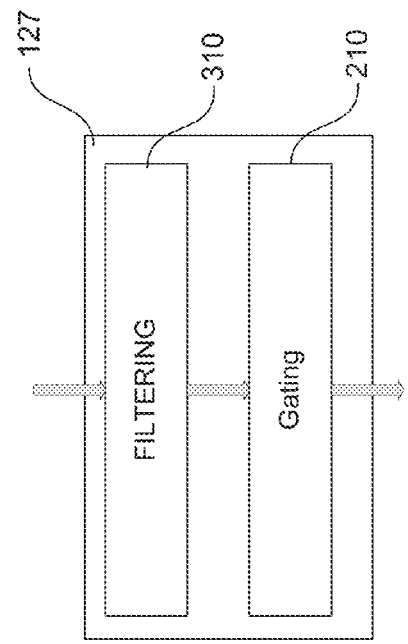
FIG. 3 is a block diagram of a processor with pre-processing filtering for channel estimation from a response generated by a Golay correlator in accordance to an embodiment.

FIG. 3 is a block diagram of a processor with pre-processing filtering for channel estimation 300 from a response generated by a Golay correlator (123,124) in accordance to an embodiment. The gating module 210 was explained above in FIG. 2. This arrangement applies the filtering before the gating processing is performed. Pre-processing filtering 310 is passing the channel response through a filter matched to the transmitted pulse-shape and it improves the probability of detecting the channel peaks. The filter may be applied to the signal at various stages (before correlation, after correlation, after summation) with the same purpose and results. A low pass filter (LPF) is used, the filter can also be a Wiener filter as LPF.

Figure 4:
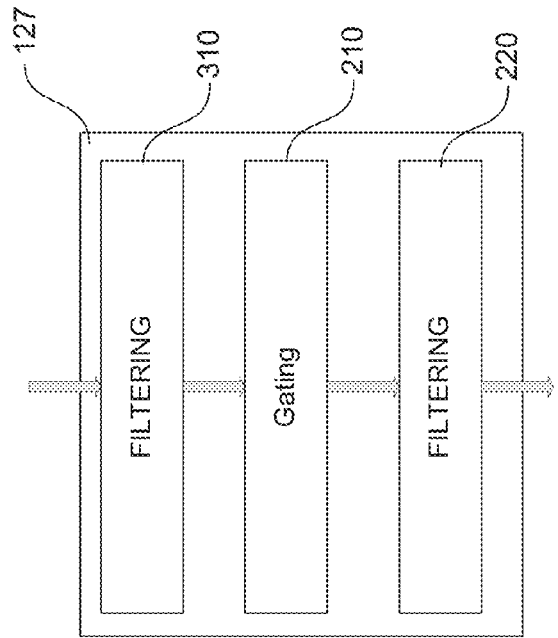
FIG. 4 is a block diagram of a processor with post-processing and pre-processing filtering for channel estimation from a response generated by a Golay correlator in accordance to an embodiment.

FIG. 4 is a block diagram of a processor with post-processing and pre-processing filtering for channel estimation from a response generated by a Golay correlator in accordance to an embodiment. The arrangement uses pre-filtering (before gating) as explained above with reference to FIG. 3 and post-filtering (after gating) as explained above with FIG. 2. A Wiener filter may be used for pre-processing or post-processing.

FIG. 5 is a waveform 500 illustrating gating and windowing on channel response in accordance to an embodiment. Channel Impulse Response is shown, which represents a pure pre-cursor 525 channel. Channel Impulse Response is shown, which represents a pure post-cursor 530 channel. The length of the post-cursor and pre-cursor varies according to the channel properties. The window length 535 is proportional to the channel estimate time domain length 540. As shown the window 126 is placed at a position able to contain the maximum channel power, the window length 535 can be adjusted to suit the real channel situation; therefore, the disclosed embodiments do not limit the window length 535. The waveform illustrates an example of windowing 126 and gating 210 on channel response. The first plot 510 depicts the absolute value of the estimated channel response vs. time axis along the CE TD Length 540. The second plot 515 depicts the channel response after windowing, according to the window parameters. The third plot 520 depicts the channel response after windowing 126 and gating 210, using the specified threshold value 555.

Figure 6:
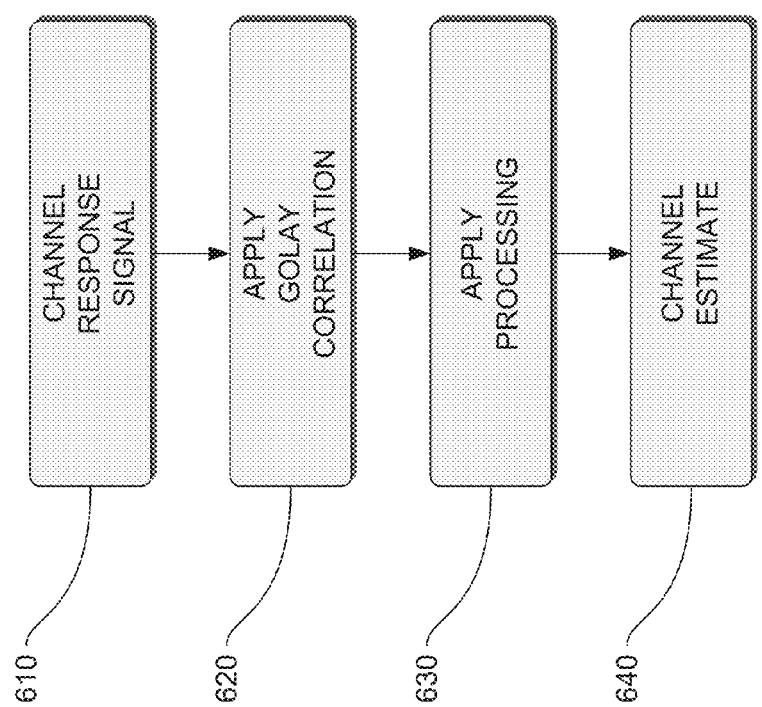

FIG. 6 is a flowchart of a method 600 for channel estimation from a response generated by a Golay correlator in accordance to an embodiment. In action 610, the method begins with receiving a channel response signal (a packet) that includes a preamble containing a channel estimation field (CEF) with a channel estimation sequence (CES) that is useful for channel estimation. A packet may include a preamble, a header, and optionally a payload which is the data portion of the packet. In action 620, Golay correlation is implemented on the packet received at action 610. In action 630, the Golay correlation taps are processed using the gating and filtering functions explained in FIGS. 2-4. In action 640, a channel estimate is produced. The produced channel estimate can be used by a control processor such as decoder 120 to assist in subsequent demodulation, and other functions that assist in the receiving of a transmitted signal such as a communication packet.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the present invention provide a non-volatile computer readable medium encoded with computer executable instructions, which when accessed, causes a machine to perform functions such as Golay Correlation, Windowing, Overlap and Add algorithm, gating, filtering, and Wiener Filtering for channel estimation.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A channel estimation method, comprising:
receiving a data stream transmitted over a channel from a device capable of performing wireless communications;
generating a channel response of the received data stream by using a Golay correlator, wherein the Golay correlator generates a first Golay sequence ($G_a$) and a second Golay sequence ($G_b$);
applying an overlap-add method to the first and second Golay sequences to generate a series of sequences;
processing using time-domain operations the generated series of sequences to improve channel estimation generated by the Golay correlator.

2. The method according to claim 1, wherein the processing is gating and filtering the response of the Golay correlator.

3. The method according to claim 2, wherein the filtering is performed before the gating, after the gating, or before and after the gating.

4. The method according to claim 3, wherein the filtering is performed by a low-pass-filter.

5. The method according to claim 3, wherein the filtering is performed by a Wiener filter.

6. The method according to claim 1, wherein the processing comprises gating that is selected from a group consisting of smooth gating, threshold gating, oversampling with smooth gating or threshold gating, threshold gating based on noise level, gating with a time-dependent threshold, adaptive gating, windowing and a combination thereof.

7. The method according to claim 6, wherein the processing comprises at least one Wiener filter to perform filtering before the gating, after the gating, or before and after the gating.

8. An apparatus comprising:
a receiver to receive a data stream transmitted over a channel from a device capable of performing wireless communications;
a Golay correlator to generate a channel response of the received data stream, wherein the Golay correlator generates a first Golay sequence ($G_a$) and a second Golay sequence ($G_b$);
an overlap and add (OLA) module to apply an overlap-add method to the first and second Golay sequences to generate a series of sequences;
an electronic device operable to communicate in a wireless network and adapted to process using time-domain operations a channel response that is generated by the OLA module.

9. The apparatus according to claim 8, wherein the processing is gating and filtering the response of the Golay correlator.

10. The apparatus according to claim 9, wherein the filtering is performed before the gating, after the gating, or before and after the gating.

11. The apparatus according to claim 10, wherein the filtering is performed by a low-pass-filter.

12. The apparatus according to claim 10, wherein the filtering is performed by a Wiener filter.

13. The apparatus according to claim 8, wherein the processing comprises gating that is selected from a group consisting of smooth gating, threshold gating, oversampling with smooth gating or threshold gating, threshold gating based on noise level, gating with a time-dependent threshold, adaptive gating, windowing and a combination thereof.

14. The apparatus according to claim 13, wherein the processing comprises at least one Wiener filter to perform filtering before the gating, after the gating, or before and after the gating.

15. A non-transitory computer readable medium encoded with computer executable instructions, which when accessed, cause a machine to perform operations comprising:
receiving a data stream transmitted over a channel from a device capable of performing wireless communications;
generating a channel response of the received data stream by using a Golay correlator, wherein the Golay correlator generates a first Golay sequence ($G_a$) and a second Golay sequence ($G_b$);
applying an overlap-add method to the first and second Golay sequences to generate a series of sequences representing the channel response;
processing using time-domain operations a channel response that is generated by the overlap-add method.

16. The non-transitory computer readable medium encoded with computer executable instructions according to claim 15, wherein the processing is gating and filtering the response of the Golay correlator.

17. The non-transitory computer readable medium encoded with computer executable instructions according to claim 16, wherein the filtering is performed before the gating, after the gating, or before and after the gating.

18. The non-transitory computer readable medium encoded with computer executable instructions according to claim 17, wherein the filtering is performed by a low-pass-filter.

19. The non-transitory computer readable medium encoded with computer executable instructions according to claim 18, wherein the low-pass filter is a Wiener filter.

20. The non-transitory computer readable medium encoded with computer executable instructions according to claim 15, wherein the processing comprises gating that is selected from a group consisting of smooth gating, threshold gating, oversampling with smooth gating or threshold gating, threshold gating based on noise level, gating with a time-dependent threshold, adaptive gating, windowing and a combination thereof.

21. The non-transitory computer readable medium encoded with computer executable instructions according to claim 20, wherein the processing comprises at least one Wiener filter to perform filtering before the gating, after the gating, or before and after the gating.

* * * * *